US008429935B2

(12) United States Patent
Hasegawa et al.

(10) Patent No.: US 8,429,935 B2
(45) Date of Patent: Apr. 30, 2013

(54) BONDING METHOD OF BASE MATERIALS, AND MANUFACTURING METHOD OF IMAGE DISPLAY APPARATUS

(75) Inventors: Mitsutoshi Hasegawa, Yokohama (JP); Mamo Matsumoto, Hiratsuka (JP); Tomohiro Saito, Kouza-gun (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/879,652

(22) Filed: Sep. 10, 2010

(65) Prior Publication Data

US 2011/0061804 A1 Mar. 17, 2011

(30) Foreign Application Priority Data

Sep. 14, 2009 (JP) ................................ 2009-211713

(51) Int. Cl.
*C03B 23/203* (2006.01)

(52) U.S. Cl.
USPC .................. 65/43; 65/33.6; 65/42; 156/272.2

(58) Field of Classification Search ................... 65/33.6, 65/42, 43; 156/272.2
See application file for complete search history.

(56) References Cited

U.S. PATENT DOCUMENTS

| | | | | |
|---|---|---|---|---|
| 2003/0066311 | A1* | 4/2003 | Li et al. | 65/43 |
| 2005/0001545 | A1* | 1/2005 | Aitken et al. | 313/512 |
| 2006/0082298 | A1 | 4/2006 | Becken et al. | |

FOREIGN PATENT DOCUMENTS

| | | | |
|---|---|---|---|
| CN | 1798710 | A | 7/2006 |
| EP | 991098 | A | 4/2000 |
| EP | 1858049 | A | 11/2007 |
| JP | 2000-106108 | A | 4/2000 |
| JP | 2000-208074 | A | 7/2000 |
| JP | 2008-517446 | T | 5/2008 |
| KR | 2001-0098663 | A | 11/2001 |

OTHER PUBLICATIONS

Corning 1737 Glass Substrate Material Information.*
Corning Eagle 2000 Glass Substrate Material Information.*

* cited by examiner

*Primary Examiner* — Matthew Daniels
*Assistant Examiner* — Cynthia Szewczyk
(74) *Attorney, Agent, or Firm* — Canon USA Inc. IP Division

(57) ABSTRACT

It arranges a bonding material between a pair of base materials having different heat capacities and in which a difference between thermal expansion coefficients thereof is within $10\times10^{-7}$/° C.; and bonds the pair of the base materials by the bonding material, by irradiating electromagnetic wave to the bonding material to melt and then harden it, wherein a thermal expansion coefficient at part of the bonding material facing one of the pair of the base materials of which the heat capacity is smaller is smaller than a thermal expansion coefficient at part of the bonding material facing the other of the pair of the base materials of which the heat capacity is larger by a difference within $10\times10^{-7}$/° C., thereby bonding the base materials of which a difference of thermal expansion coefficients is relatively small, as preventing breakage and crack from occurring and further suppressing a degree of warp.

6 Claims, 5 Drawing Sheets

BONDING METHOD OF BASE MATERIALS, AND MANUFACTURING METHOD OF IMAGE DISPLAY APPARATUS

BACKGROUND OF THE INVENTION

1. Field of the Invention

The present invention relates to a method of bonding base materials and a method of manufacturing an image display apparatus, and more particularly to a method of bonding members constituting an envelope of the image display apparatus.

2. Description of the Related Art

Japanese Patent Application Laid-Open No. 2000-106108 discloses a manufacturing method of a cathode ray tube, which includes a step of glass-bonding (frit-sealing) a face plate having a phosphor layer of displaying an image in response to irradiation of electrons emitted from a cathode ray tube and a funnel cone portion of acting as an outer container of the cathode ray tube. Since a thermal expansion coefficient of the funnel cone portion is different from a thermal expansion coefficient of the face plate by at least $10\times10^{-7}/^{\circ}$ C. or more, there is a possibility that breakage or crack occurs in the funnel cone portion and/or the face plate due to thermal contraction of frit glass at the time of the glass bonding. According to Japanese Patent Application Laid-Open No. 2000-106108, the thermal expansion coefficient of the frit glass is made different for each of parts so as to prevent the occurrence of breakage or crack. For example, Japanese Patent Application Laid-Open No. 2000-106108 describes a method of changing stepwise the thermal expansion coefficient of the frit glass between the face plate and the funnel cone portion, and a method of constituting the frit glass as a laminated body of plural different kinds of frit glasses of which the thermal expansion coefficients are mutually different.

Japanese Patent Application Laid-Open No. 2008-517446 discloses an airtight sealing method of an organic light-emitting diode display. In this method, it is possible to airtightly seal a cover plate and a substrate with each other by irradiating a laser beam to a frit provided on the cover plate and thus melting the frit. A region including an electrode and a region not including an electrode exist along a sealing line on the substrate. For this reason, it is possible to uniformly heat the frit by properly changing moving speed and/or power of the laser beam along the sealing line.

As described in Japanese Patent Application Laid-Open No. 2000-106108, when the thermal expansion coefficient of the pair of the base materials to be bonded is large, a problem of occurrence of the breakage or the crack in the base material is actualized. In other words, when a difference between the thermal expansion coefficients of the base materials constituting the pair is below $10\times10^{-7}/^{\circ}$ C. being a rough standard indicated in Japanese Patent Application Laid-Open No. 2000-106108, the problem of occurrence of the breakage or the crack in the base material is not so actualized. However, even when the difference of the thermal expansion coefficients is small and thus the breakage or the crack of the base material does not occur, there is a possibility that the base material is warped due to the difference between the thermal expansion coefficients.

The above-described problem will be concretely described with reference to FIGS. 5A to 5C. FIG. 5A illustrates a flat plate, a frame member and a bonding material which bonds the flat plate and the frame member to each other, and FIG. 5B is the cross section diagram which is viewed along the 5B-5B line in FIG. 5A. In the drawings, a bonding material 103 extends like a frame along a frame member 102 between a flat plate 101 and the frame member 102. If a laser beam is irradiated from the side of the frame member 102 or the side of the flat plate 101 to the bonding material 103, the bonding material 103 is melted and then hardened, whereby the flat plate 101 and the frame member 102 is bonded to each other. Since the irradiated laser beam is focused on the bonding material 103, large heat energy is applied to the bonding material 103, whereby the bonding material 103 reaches a high temperature. Further, the applied heat energy is transmitted also to the flat plate 101 and the frame member 102, thereby increasing temperatures of the flat plate 101 and the frame member 102. Each of the flat plate 101 and the frame member 102 thermally expands according to its thermal expansion coefficient. Since the bonding material 103 is being melted, the bonding material 103 is deformed according to thermal deformations of the flat plate 101 and the frame member 102. For this reason, since the flat plate 101 and the frame member 102 are not held by the bonding material 103, a stress is hardly generated on the flat plate 101 and the frame member 102. After then, although they are cooled, a stress is hardly generated on the flat plate 101 and the frame member 102 while the bonding material 103 is being melted because of the same reason as above. However, if the bonding material 103 begins to harden, the flat plate 101 and the frame member 102 are held by the bonding material 103. Then, the flat plate 101 and the frame member 102 are cooled down in this state, whereby the flat plate 101 and the frame member 102 begin to contract as indicated by the arrows in FIG. 5C. The thermal contraction at this time is thermal contraction so as to reduce the length of the side of each of the flat plate 101 and the frame member 102 while maintaining a similar figure of each of the flat plate 101 and the frame member 102. Here, thermal contraction amounts of the flat plate 101 and the frame member 102 are different from each other due to a difference of thermal expansion coefficients and a difference of temperature drop amounts between the flat plate 101 and the frame member 102. Thus, as illustrated in FIG. 5C, a warp occurs in the assembled body, in which the flat plate 101 and the frame member 102 have been bonded to each other by the bonding material 103, due to the difference between the thermal contraction amounts of the flat plate 101 and the frame member 102.

SUMMARY OF THE INVENTION

The present invention aims to provide a method of bonding base materials of which a difference of thermal expansion coefficients is relatively small, as preventing breakage and crack from occurring and further suppressing a degree of a warp.

The present invention is characterized by a base material bonding method which comprises: arranging a bonding material between a pair of base materials of which heat capacities are mutually different and in which a difference between thermal expansion coefficients thereof is within $10\times10^{-7}/^{\circ}$ C.; and bonding the pair of the base materials by means of the bonding material, by irradiating an electromagnetic wave to the bonding material arranged between the pair of the base materials to melt the bonding material and then hardening the melted bonding material, wherein a thermal expansion coefficient at a part of the bonding material facing one of the pair of the base materials of which the heat capacity is smaller is smaller than a thermal expansion coefficient at a part of the bonding material facing the other of the pair of the base materials of which the heat capacity is larger, by a difference within $10\times10^{-7}/^{\circ}$ C.

Further, the present invention is characterized by an image display apparatus manufacturing method, in which the above-described base material bonding method is used, wherein an image display apparatus comprises a first substrate which includes numerous electron-emitting devices, a second substrate which is positioned opposite to the first substrate and includes a fluorescent film for displaying an image in response to irradiation of electrons emitted from the electron-emitting devices, and a frame member which is positioned between the first substrate and the second substrate and forms a space between the first substrate and the second substrate, and the pair of the base materials includes the first substrate and the frame member, or the second substrate and the frame member.

Further features of the present invention will become apparent from the following description of exemplary embodiments with reference to the attached drawings.

DESCRIPTION OF THE EMBODIMENTS

Figure 1:
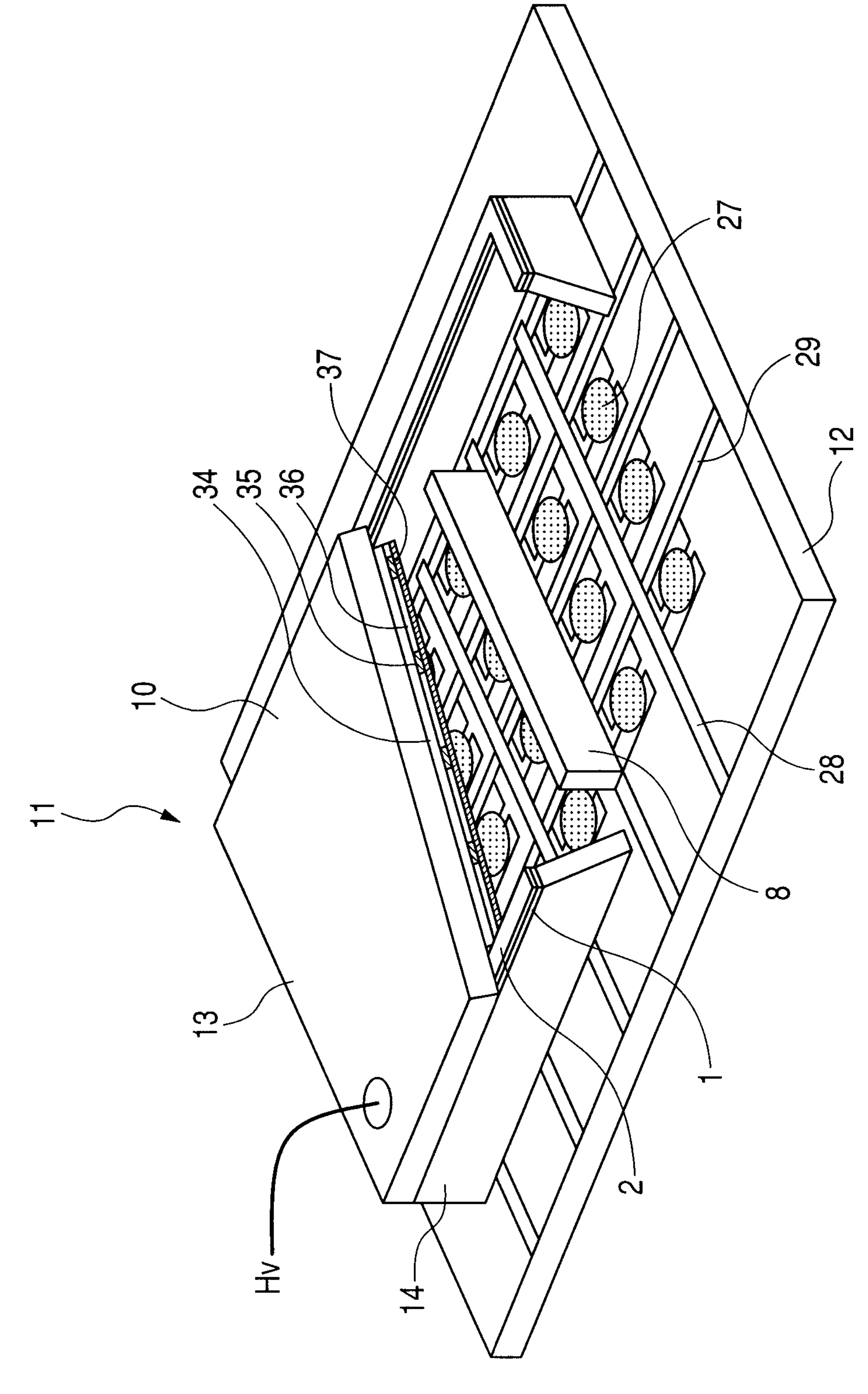
FIG. 1 is a perspective view illustrating an image display apparatus according to the present invention.

A base material bonding method according to the present invention comprises: a step of arranging a bonding material between a pair of base materials of which heat capacities are mutually different and in which a difference between thermal expansion coefficients thereof is within $10\times10^{-7}/°$ C.; and a step of bonding the pair of the base materials by means of the bonding material, by irradiating an electromagnetic wave to the bonding material arranged between the pair of the base materials to melt the bonding material and then hardening the melted bonding material. Further, a thermal expansion coefficient at a part of the bonding material facing one of the pair of the base materials of which the heat capacity is smaller is set to be smaller than a thermal expansion coefficient at a part of the bonding material facing the other of the pair of the base materials of which the heat capacity is larger, by a difference within $10\times10^{-7}/°$ C.

As described above, since the difference between the thermal expansion coefficient of one of the pair of the base materials and the thermal expansion coefficient of the other of the pair of the base materials is extremely small, i.e., within $10\times10^{-7}/°$ C., it is possible to sufficiently prevent that breakage or crack occurs in the base material due to a difference of thermal expansion amounts (i.e., thermal contraction amounts) of the pair of the base materials. Further, since the difference between the thermal expansion coefficient at the part of the bonding material facing one of the pair of the base materials and the thermal expansion coefficient at the part of the bonding material facing the other of the pair of the base materials is extremely small, i.e., within $10\times10^{-7}/°$ C., it is also possible to sufficiently prevent that breakage or crack of the bonding material itself occurs.

Further, a warp can be prevented because of such a reason as described below. That is, when the bonding material begins to harden, it begins to hold the base member. At this time, since the temperature of the pair of the base materials is still high, the base materials thermally contract along with cooling. Here, a cause of the warp is a difference between thermal contractions of the base materials, which together constitute the pair of the base materials, after the start of the hardening of the bonding material. Incidentally, a member of the pair of the base materials, of which the heat capacity is small, tends to be affected by temperature rise, the temperature of this member is higher than that of another member of the pair of the base materials, of which the heat capacity is large, at the time of the start of the hardening of the bonding material. That is, the thermal contraction amount of the member of which the heat capacity is small is large after the start of the hardening of the bonding material. In the present embodiment, the thermal expansion coefficient at the part of the bonding material facing one of the pair of the base materials, of which the heat capacity is small, is smaller than the thermal expansion coefficient at the part of the bonding material facing the other of the pair of the base materials, of which the heat capacity is large. This implies that the thermal contraction amount of the part of the bonding material facing the base material of which the heat capacity is smaller becomes small after the start of the hardening of the bonding material. The base material is fixed by the bonding material, and thus shearing force is applied from the thermally contracted bonding material to the base material. However, since the thermal contraction amount of the bonding material after the start of the hardening is small, it is difficult that the inward shearing force is applied from the bonding material to the base material, as compared with a case where the part of the bonding material, of which the thermal expansion coefficient is large, is provided so as to face the base material of which the heat capacity is smaller. That is, the thermal contraction of the base material of which the heat capacity is smaller is suppressed. Thus, the difference of the thermal contractions of the pair of the base materials after the start of the hardening of the bonding material is suppressed, whereby it is possible to reduce an extent of the warp.

Hereinafter, the embodiment of the present invention will be described. The base material bonding method according to the present invention is preferably usable in an image display apparatus manufacturing method in which a vacuum container is used. In particular, the present invention is preferably applicable to an image display apparatus in which a fluorescent film and an electron accelerating electrode are formed on a face plate of a vacuum envelope and numerous electron-emitting devices are formed on a rear plate thereof. However, it should be noted that the present invention is widely applicable to a case of manufacturing an airtight container by properly bonding plural members.

FIG. 1 is a partial cutaway perspective diagram illustrating an example of an image display apparatus to which the present invention is applied. That is, an image display apparatus 11 includes a first substrate (i.e., a rear plate) 12, a second substrate (i.e., a face plate) 13, and a frame member 14. The frame member 14 is positioned between the first substrate 12 and the second substrate 13 to form a closed space S (see FIG. 4) between the first substrate 12 and the second substrate 13. More specifically, the first substrate 12 and the frame member 14 are bonded to each other through mutually opposite faces thereof, and the second substrate 13 and the frame member 14 are bonded to each other through mutually opposite faces thereof, whereby an envelope 10 having the closed internal space S is formed. Here, the internal space S of the envelope 10 is maintained with vacuum. In the frame member 14, the reverse face of the face fixed to the first substrate 12 is the face fixed to the second substrate 13. The first substrate 12 and the frame member 14 may be previously bonded to each other. In any case, the first substrate 12, the second substrate 13 and the frame member are respectively made of glasses (glass members) in which differences among their thermal expansion coefficients are within $10\times10^{-7}$/° C. Since each of the first substrate 12 and the second substrate 13 is made of the glass member, a warp after the bonding still decreases further, whereby it is possible to achieve the bonding in which safety improves and airtightness is excellent.

Further, on the first substrate 12, numerous electron-emitting devices 27 which emit electrons according to image signals are formed, and also wirings (X-direction wirings 28, and Y-direction wirings 29) which cause the respective electron-emitting devices 27 to operate according to the image signals are formed. On the second substrate 13 which is positioned opposite to the first substrate 12, a fluorescent film 34, which emits light in response to irradiation of the electrons emitted by the electron-emitting devices 27 to display an image, is provided. Also, on the second substrate 13, a black stripe is provided. Here, the fluorescent film 34 and the black stripe 35 are alternately arranged. Further, a metal back 36, which is made by an Al thin film, is formed on the fluorescent film 34. The metal back 36, which has a function as an electrode for attracting the electrons, is supplied with potential from a high-voltage terminal Hv provided on the envelope 10. Further, a non-evaporable getter 37, which is made by a Ti thin film, is formed on the metal back 36.

Figure 2:
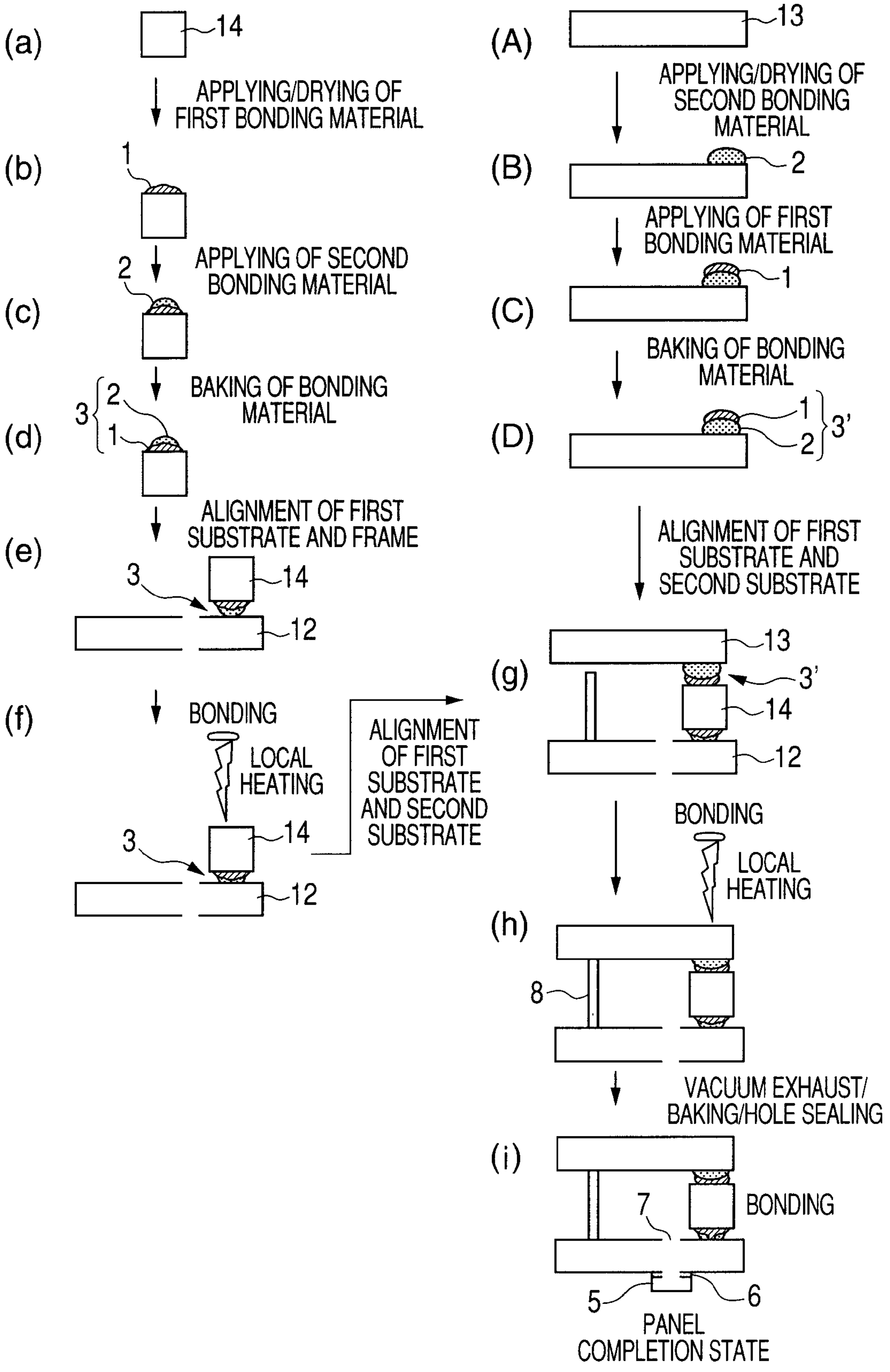
FIG. 2 is a cross section diagram of a bonding portion, for describing a process flow according to the present invention.

Subsequently, the present embodiment will be described concretely with reference to FIGS. 2, 3A, 3B, 3C, 3D and 4. More specifically, FIG. 2 is the cross section diagram for describing a process flow (bonding procedure) according to the present invention. FIGS. 3A, 3B, 3C and 3D are the two-dimensional diagrams each illustrating the bonding portion according to the present invention. More specifically, FIG. 3A corresponds to (b) in FIG. 2, FIG. 3B corresponds to (d) in FIG. 2, FIG. 3C corresponds to (B) in FIG. 2, and FIG. 3D corresponds to (D) in FIG. 2. Further, FIG. 4 is the partial cross section diagram illustrating an example of the bonding portion according to the present invention.

(Step S1: Step of Arranging Bonding Material to Frame Member)

Initially, a bonding material 3 which is made by a laminated body consisting of a first bonding material 1 and a second bonding material 2 is arranged on the face of one side of the frame member 14. More specifically, the first bonding material 1 is first formed in screen printing so as to have desired width and thickness along the peripheral length, and then the formed material is dried at 120° C. ((b) in FIG. 2, FIG. 3A). After then, the second bonding material 2 which is made of glass frit is formed, as well as the first bonding material 1, in screen printing so as to have desired width and thickness on the first bonding material 1 ((c) in FIG. 2). Here, the thermal expansion coefficient of the second bonding material 2 is larger than that of the first bonding material 1 by a difference within $10\times10^{-7}$/° C. Further, to burn out organic matters, the bonding material is heated and baked at least once at 350° C. or more, whereby the bonding material 3 is formed ((d) in FIG. 2, FIG. 3B). Here, as a method of applying the bonding material, a dispenser method, an offset printing method and the like can be used in addition to such a screen printing method as described above. Since the bonding material is baked at least once at the temperature of 350° C. or more, it is possible to suppress that air bubbles are generated in the boding material when the bonding is performed, whereby it is possible to achieve the bonding in which airtightness is more excellent.

Although the bonding material 3 is the laminated body formed by two layers of the bonding materials, a laminated body formed by three or more layers can be used as the bonding material. Also, the bonding material may be formed as a one-layer constitution. In this case, it is desirable, by a known technique of adjusting the content of a filler, to make the thermal expansion coefficients of the both faces of the bonding material different from each other by a difference within $10\times10^{-7}$/° C.

(Step S1': Step of Arranging Bonding Material to Second Substrate)

In the same manner as that in the step S1, a bonding material 3' which is made by a laminated body consisting of the first bonding material 1 and the second bonding material 2 is arranged. More specifically, on the face of the second substrate 13 opposite to the frame member 14, the second bonding material 2 is first formed in screen printing so as to have desired width and thickness along the peripheral length, and then the formed material is dried at 120° C. ((B) in FIG. 2, FIG. 3C). After then, the first bonding material 1 is likewise formed in screen printing so as to have desired width and thickness on the second bonding material 2 ((C) in FIG. 2). Further, to burn out organic matters, the bonding material is heated and baked at 350° C. or more, whereby the bonding material 3' is formed ((D) in FIG. 2, FIG. 3D).

(Step S2: Step of Bonding First Substrate and Frame)

Subsequently, the bonding material 3 is put on the first substrate 12, and the frame member 14 is located at a predetermined position on the first substrate 12 ((e) in FIG. 2). Then, light emitted from a halogen lamp or a laser beam output device is condensed and irradiated to the bonding material 3 while the first substrate 12 is being pressed from the side of the frame member 14, whereby the bonding material 3 is locally heated. Thus, the bonding material 3 is melted, and then hardened, whereby the first substrate 12 and the frame member 14 are bonded to each other ((f) in FIG. 2). Here, the light to be used is not specifically limited, if it is an electromagnetic wave having sufficient energy for enabling to melt the bonding material 3. A heat capacity of the first substrate 12 is larger than a heat capacity of the frame member 14. Consequently, the first bonding material 1 is arranged so as to face the substrate (i.e., the frame member 14) of which the heat capacity is smaller, and the second bonding material 2 of which the thermal expansion coefficient is larger than that of the first bonding material 1 is arranged so as to face the substrate (i.e., the first substrate 12) of which the heat capacity is larger.

Incidentally, when the bonding material having the one-layer constitution is used, the bonding material is arranged so that the thermal expansion coefficient of the part facing the frame member 14 being the substrate of which the heat capacity is smaller than that of the first substrate 12 is made smaller than the thermal expansion coefficient of the part facing the first substrate 12 being the substrate of which the heat capacity is larger than that of the frame member 14.

When the bonding material 3 is heated, the first substrate 12 and the frame member 14 which are adjacent to the bonding material 3 are also heated through the bonding material 3 acting as a heat source, and temperatures of the first substrate 12 and the frame member 14 increase. As a result, the first substrate 12, the frame member 14 and the bonding material 3 thermally expand. Here, since expansion rates of these parts are generally different from others due to differences of the thermal expansion coefficients and differences of the temperatures, these parts are mutually misaligned. However, since the bonging material 3 is melting, mutual misalignments of these parts due to the differences of thermal expansions are absorbed, whereby the first substrate 12, the frame member 14 and the bonding material 3 thermally expand freely without being held by other parts respectively. After then, when the irradiation of laser beams or the like ends, the temperatures of the first substrate 12, the frame member 14 and the bonding material 3 begin to decrease, and these parts are mutually misaligned again due to the differences of thermal expansions. However, until the temperature of the bonding material 3 reaches a hardening temperature, the first substrate 12, the frame member 14 and the bonding material 3 thermally contract freely without being held by other parts respectively, because of the same reason as described above.

Subsequently, when the temperature of the bonding material 3 reaches the hardening temperature, the first substrate 12 and the frame member 14 are held by the bonding material 3. However, since the first substrate 12, the frame member 14 and the bonding material 3 are still in high-temperature states at this moment, these parts continue to thermally contract as the temperatures of these parts further decrease after the bonding material 3 is hardened. Since the heat capacity of the frame member 14 is smaller than that of the first substrate 12, the temperature of the frame member 14 tends to easily increase as compared with the first substrate 12, whereby the temperature of the frame member 14 is still higher than that of the first substrate 12 even after the temperature of the bonding material 13 reaches the hardening temperature. Therefore, a temperature drop of the frame member 14 after hardening of the bonding material 3 is larger than that of the first substrate 12, and the frame member 14 tends to thermally contract easily as compared with the first substrate 12. That is, to reduce the warp, it is important to suppress the thermal contraction of the frame member 14.

Incidentally, also the bonding material 3 thermally contracts according to its temperature drop. Here, since the frame member 14 is held by the bonding material 3, the shearing force which is applied from the bonding material 3 to the frame member 14 influences the contraction of the frame member 14. Since the thermal expansion coefficient of the first bonding material 1 being in contact with the frame member 14 is smaller than that of the second bonding material 2, the thermal contraction amount of the first bonding material 1 is smaller than the thermal contraction amount of the second bonding material 2. In other words, the force of the first bonding material 1 for pulling the frame member 14 inward is smaller than that of the second bonding material 2. Besides, it is conceivable that the force of the first bonding material 1 for extending the frame member 14 outward is applied to the frame member 14 according to the thermal expansion coefficients and the temperature drop amounts of the first bonding material 1 and the frame member 14. Also in this case, the force of the first bonding material 1 for extending the frame member 14 outward is larger than that of the second bonding material 2. In any case, the thermal contraction of the frame member 14 is reduced as compared with a case where the second bonding material 2 is positioned adjacently, whereby it is possible to reduce the warp. As a result, the first substrate 12 and the frame member 14 are safely and firmly fixed to each other with sufficient airtightness and less warp.

(Step S3: Step of Bonding Frame Member to which First Substrate has been Bonded to Second Substrate)

Subsequently, a spacer 8 is arranged on the wirings 28 and 29 of the first substrate 12. Then, the bonding material 3' is brought into contact with the frame member 14, and the second substrate 13 is arranged through alignment on the face of the frame member 14 different from the face thereof bonded to the first substrate 12 ((g) in FIG. 2). Subsequently, light emitted from the halogen lamp or the laser beam output device is condensed and irradiated to the bonding material 3' while the bonding material 3' is being pressed from the side of the second substrate 13, whereby the bonding material 3' is locally heated. Here, such pressing may be performed by mechanically adding a load or adding the atmospheric pressure as decreasing pressure. Thus, the bonding material 3' is melted, and then hardened, whereby the second substrate 13 and the frame member 14 are bonded to each other ((h) in FIG. 2). At that time, the spacer 8 and the second substrate 13 are in contact with each other, whereby an interval between the first substrate 12 and the second substrate 13 is maintained constantly.

Even where the frame member 14 and the second substrate 13 are bonded to each other, since the first bonding material 1 of which the thermal expansion coefficient is smaller is positioned on the side of the frame member 14 of which the heat capacity is smaller, it is possible to have the same effect as described above. As a result, the second substrate 13 and the frame member 14 are safely and firmly fixed to each other with sufficient airtightness and less warp, whereby it is possible to obtain the envelope 10 which has high airtightness.

(Step S4: Step of Performing Baking and Sealing)

To increase a degree of vacuum of the internal space of the envelope 10, baking is performed at a predetermined temperature after the heating process. More specifically, the envelope 10 is set up in a vacuum chamber (not illustrated). Subsequently, the degree of vacuum in the chamber is decreased to $10^{-3}$ Pa or so, as the inside of the envelope 10 is vacuum-exhausted through an exhaust hole 7. After then, the envelope 10 is wholly heated, and the non-evaporable getter 37 is activated. Further, the exhaust hole 7 is sealed by a sealing material 6 and a sealing cover 5, and the image display apparatus 11 is thus formed. As a material of the sealing cover 5, it is desirable to use the material same as that of the first substrate 12. However, it is also possible to use metal or alloy such as Al, Ti, Ni or the like which is not melted in vacuum baking. Further, it is possible to have the same effect as described above even if the heating process ((h) in FIG. 2) is performed after the baking process ((i) in FIG. 2).

To determine the bonding material and the bonding method which are applicable to the image display apparatus, it is necessary to consider the following matters:

(1) heat resistance in the in-vacuum baking (high vacuum forming) process;

(2) maintenance of high vacuum (vacuum leakage minimum, gas permeableness minimum);

(3) securement of adhesiveness to the glass member;

(4) securement of a low outgassing (high vacuum maintaining) characteristic; and (5) less warp of the image display apparatus after the bonding.

The bonding method according to the present embodiment satisfies all of such conditions.

Hereinafter, the present invention will be described in detail by taking concrete examples.

EXAMPLE 1

The image display apparatus 11 to which the bonding material and the bonding method of this example are applied has the same constitution as that of the apparatus schematically illustrated in FIG. 1. That is, the plural electron-emitting devices 27 are arranged, as well as the wirings, on the first substrate 12. Further, the first substrate 12 and the frame member 14 are bonded to each other by the first and second bonding materials 1 and 2, and also the second substrate 13 and the frame member 14 are bonded to each other by the first and second bonding materials 1 and 2.

The thermal expansion coefficients of the first substrate 12, the second substrate 13 and the frame member 14 were made the same, i.e., $80\times10^{-7}$/° C. Since the material of the frame member 14 was made the same as that of each of the first substrate 12 and the second substrate (i.e., PD200 (available from ASAHI GLASS CO., LTD.)), the heat capacity of the frame member 14 was smaller than that of each of the first substrate 12 and the second substrate 13.

In the image display apparatus of this example, the plural (240 rows×720 columns) surface conduction electron-emitting devices 27 are formed on the first substrate 12. The surface conduction electron-emitting devices 27 are electrically connected to the X-direction wirings (also called upper wirings) 28 and the Y-direction wirings (also called lower wirings) 29, whereby the simple matrix wirings are provided. The fluorescent film 34 consisting of striped red, green and blue phosphors (not illustrated) and the black stripe 35 are alternately arranged on the second substrate 13. Further, on the fluorescent film 34, the metal back 36 made by an Al thin film is formed by a sputtering method at the thickness 0.1 μm, and a Ti film formed at the thickness 0.1 μm by an electron beam vacuum vapor deposition method is provided as the non-evaporable getter 37.

Hereinafter, the bonding method of the image display apparatus in this example will be described with reference to FIGS. 1, 2 and 3A to 3D. In this example, the glass frit is used as the bonding material 3.

(Step a) A paste (the first bonding material 1) obtained by compounding terpineol, Elvacite™, and Bi-based lead-free glass frit of BAS115 base (available from ASAHI GLASS CO., LTD.: the thermal expansion coefficient $\alpha=75\times10^{-7}$/° C.)) acting as the basic material of the first bonding material 1 was prepared. The paste was formed in the screen printing so as to have the width 1 mm and the thickness 10 μm along the peripheral length of the frame member 14, and then dried at 120° C. ((b) in FIG. 2, FIG. 3A).

(Step b) A paste (the second bonding material 2) obtained by compounding terpineol, Elvacite™, and Bi-based lead-free glass frit of BAS115 base (available from ASAHI GLASS CO., LTD.: the thermal expansion coefficient $\alpha=79\times10^{-7}$/° C.)) acting as the basic material of the second bonding material 2 was prepared. The paste was formed, as well as the first bonding material 1, in the screen printing so as to have the width 1 mm and the thickness 10 μm on the dried first bonding material 1 ((c) in FIG. 2).

Figure 3A:
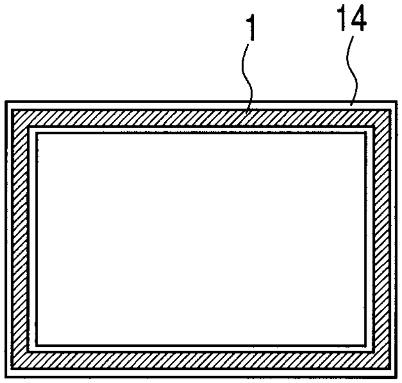
FIGS. 3A, 3B, 3C and 3D are two-dimensional diagrams each illustrating the bonding portion according to the present invention.
Figure 3C:
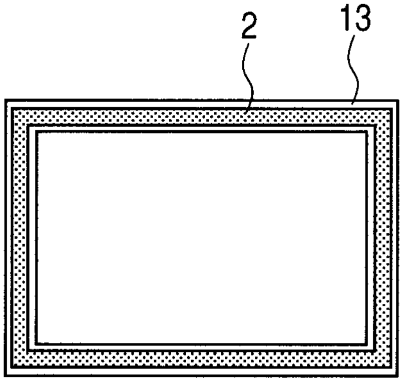
Figure 3B:
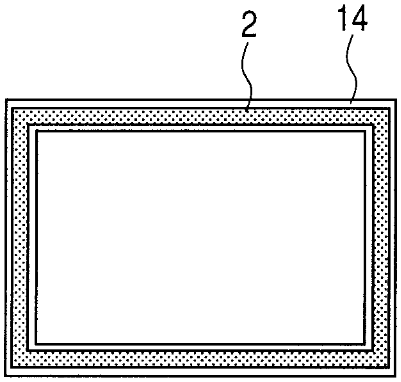
Figure 4:
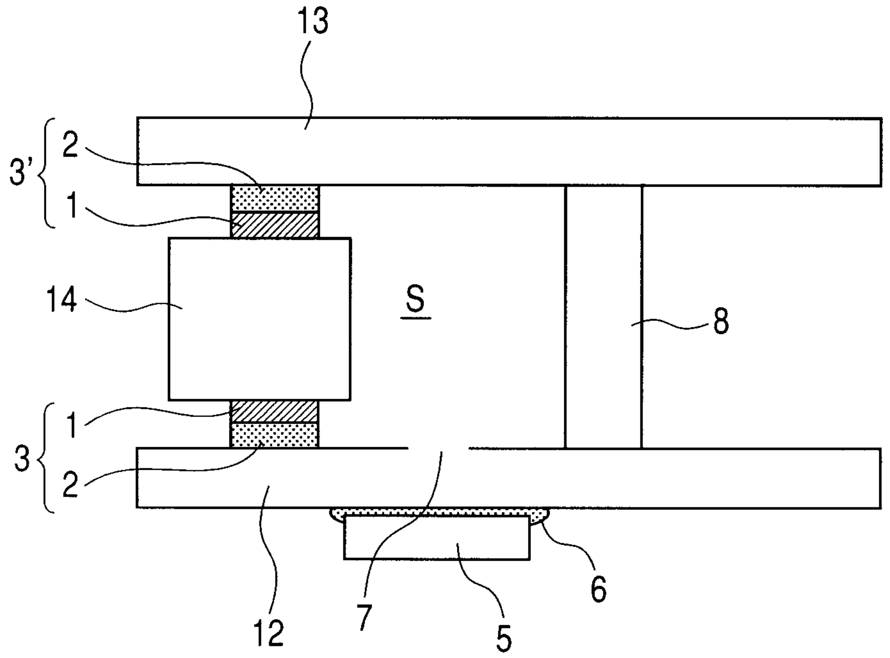
FIG. 4 is a partial cross section diagram of the bonding portion according to the present invention.
Figure 5A:
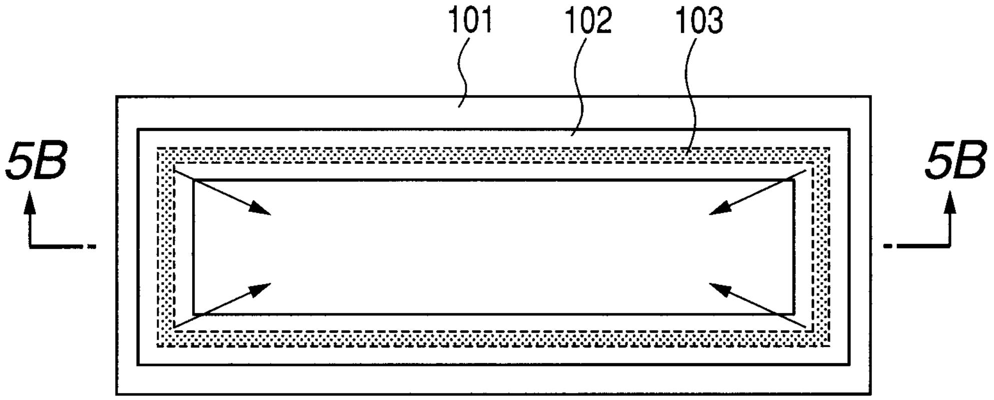
FIGS. 5A, 5B and 5C are diagrams for describing a problem to be solved by the present invention.
Figure 5B:
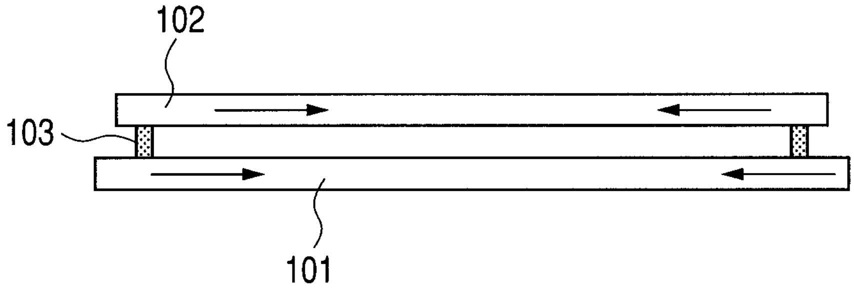
Figure 5C:
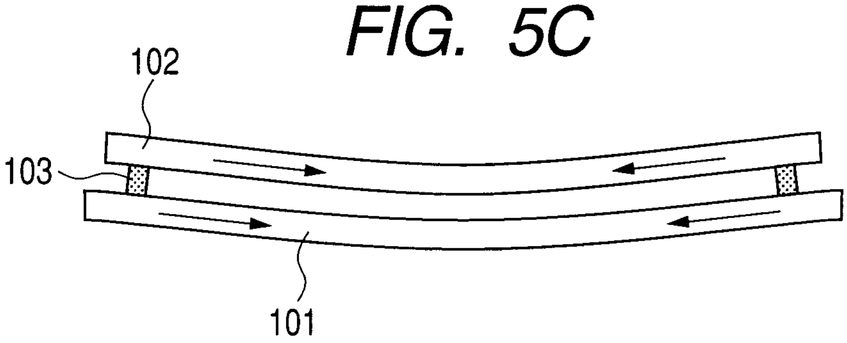

(Step c) To burn out the organic matters, the bonding material was heated and baked at 480° C., whereby the bonding material 3 was formed ((d) in FIG. 2, FIG. 3B).

(Step A) A paste (the second bonding material 2) obtained by compounding terpineol, Elvacite™, and Bi-based lead-free glass frit of BAS115 base (available from ASAHI GLASS CO., LTD.: the thermal expansion coefficient $\alpha=79\times10^{-7}$/° C.)) acting as the basic material of the second bonding material 2 was prepared. The paste was formed in the screen printing so as to have the width 1 mm and the thickness 10 μm along the peripheral length on the face of the second substrate 13 opposite to the frame member 14, and then dried at 120° C. ((B) in FIG. 2, FIG. 3C).

(Step B) Subsequently, a paste obtained by compounding terpineol, Elvacite™, and Bi-based lead-free glass frit of BAS115 base (available from ASAHI GLASS CO., LTD.: the thermal expansion coefficient $\alpha=75\times10^{7}$/° C.)) acting as the basic material of the first bonding material 1 was prepared. The paste was formed, as well as the first bonding material 1, in the screen printing so as to have the width 1 mm and the thickness 10 μm on the dried second bonding material 2 ((C) in FIG. 2).

Figure 3D:
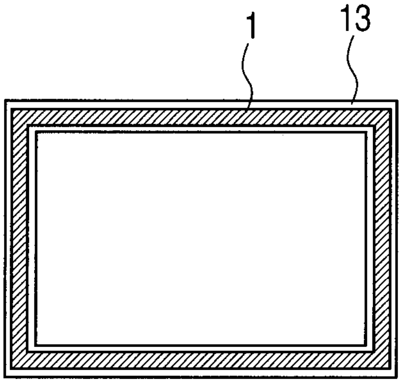

(Step C) To burn out the organic matters, the bonding material was heated and baked at 480° C., whereby the bonding material 3' was formed ((D) in FIG. 2, FIG. 3D).

(Step d) The bonding material 3 was put on the first substrate 12, and the frame member 14 was located at the predetermined position on the first substrate 12 ((e) in FIG. 2).

(Step e) A semiconductor laser beam having the wavelength 980 nm, the power 130 W and the effective diameter 1 mm was irradiated, as scanning at the speed 300 mm/S, to the bonding material 3 while pressing the bonding material from the side of the frame member 14, whereby the bonding material 3 was locally heated. Thus, the bonding material was melted, and then hardened, whereby the first substrate 12 and the frame member 14 were bonded to each other ((f) in FIG. 2).

(Step f) The spacer 8 was arranged on the wirings 28 and 29 of the first substrate 12.

(Step g) The bonding material 3' formed on the second substrate 13 was brought into contact with the other face of the frame member 14 to which the first substrate 12 was not bonded, and the second substrate 13 was arranged through alignment on the first substrate 12 ((g) in FIG. 2).

(Step h) A semiconductor laser beam having the wavelength 980 nm, the power 130 W and the effective diameter 1 mm was irradiated, as scanning at the speed 300 mm/S, to the bonding material 3' while pressing the bonding material from the side of the second substrate 13, whereby the bonding material 3' was locally heated. Thus, the bonding material 3' was melted, and then hardened, whereby the frame member 14 bonded to the second substrate 13 was bonded to the first substrate 12 ((h) in FIG. 2). The spacer 8 and the second substrate 13 were in contact with each other, whereby the interval between the first substrate 12 and the second substrate 13 was maintained constantly, and the envelope 10 was formed.

(Step i) The envelope 10 was set up in the vacuum chamber (not illustrated). Subsequently, the degree of vacuum in the chamber was set to $10^{-3}$ Pa or so, as the inside of the envelope 10 was vacuum-exhausted through the exhaust hole 7. Further, the envelope 10 was wholly heated up to 350° C., and the non-evaporable getter 37 was activated. After then, the exhaust hole 7 was sealed by the sealing material 6 made by In and the sealing cover 5 made by a glass substrate, whereby the image display apparatus 11 was formed.

In the image display apparatus of this example shown in FIG. 1 which has been bonded as described above, the bonding material having the smaller thermal expansion coefficient in the two kinds of bonding materials is formed on the side of the base material (the frame member 14) having the smaller heat capacity in the pair of the base materials in the steps a to c (the steps A to C). Thus, the thermal contraction of the base material in which the temperature easily increases due to the small heat capacity is suppressed, and the warp after the bonding of the base material further reduces, thereby achieving the laser bonding in which safety improves and airtightness is excellent.

EXAMPLE 2

This example is the same as the example 1 except that, as a material of the frame member, soda lime glass (AS soda lime glass: the thermal expansion coefficient $87\times10^{-7}$/° C.) is used instead of PD200.

In the image display apparatus of this example, the thermal expansion coefficient of the frame member 14 is larger than the thermal expansion coefficients of the first substrate 12 and the second substrate 13, and the heat capacity of the frame member 14 is smaller than the heat capacities of the first substrate 12 and the second substrate 13. In the steps a to c (the steps A to C), the bonding material having the smaller thermal expansion coefficient in the two kinds of bonding materials was formed on the side of the frame member 14. Thus, the thermal contraction of the base material (the frame member 14) in which the temperature easily increased due to the small heat capacity was suppressed, and the warp after the bonding of the base material further reduced, thereby achieving the laser bonding in which safety improved and airtightness was excellent.

EXAMPLE 3

This example is the same as the examples 1 and 2 except that sheet frit is used. More specifically, the circumferential flat first bonding material 1 having the thermal expansion coefficient $\alpha=75\times10^{-7}/°$ C., the thickness 0.02 mm and the width 1 mm was previously baked like a sheet to form the frit. Subsequently, the circumferential flat second bonding material 2 having the thermal expansion coefficient $\alpha=79\times10^{-7}/°$ C., the thickness 0.02 mm and the width 1 mm was laminated like a sheet on the frit, and the obtained laminated body was baked, thereby forming the bonding material 3. Then, the steps a, b, A and B were omitted, and the bonding material 3 was arranged so as to bring the first bonding material 1 having the small thermal expansion coefficient into contact with the frame member 14 having the small heat capacity.

In the image display apparatus of this example formed as described above, since the thermal contraction of the base material in which the temperature easily increases due to the small heat capacity could be suppressed, the warp after the bonding of the base material further reduced, thereby achieving the laser bonding in which safety improved and airtightness was excellent. In this example, the non-evaporable getter 37 was set on the second substrate 13. However, the non-evaporable getter 37 may be set on the wiring of the first substrate 12 (not illustrated).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-211713, filed Sep. 14, 2009, which is hereby incorporated by reference herein in its entirety.

What is claimed is:

1. A manufacturing method of an envelope for an image display apparatus comprising:

providing a pair of base members, one of the pair of base member has a different value in a heat capacity and a CTE from the other of the pair of base member;

arranging a plurality of bonding materials between the pair of base members on top of one another such that one of the plurality of bonding materials faces said one of the pair of base members which has a larger heat capacity than said the other of the pair of base members and the other of the plurality of bonding materials faces said the other of the pair of base members; and bonding the pair of base member by irradiating an electromagnetic wave to the plurality of bonding materials, wherein said one of the plurality of bonding materials has a larger CTE than said the other of the plurality of bonding materials and a difference of a CTE between said one of the plurality of bonding materials and said the other of the plurality of bonding materials is within $10\times10^{-7}/°$ C., and wherein the CTE indicates a coefficient of thermal expansion.

2. The manufacturing method of an envelope for an image display apparatus according to claim 1, wherein in the arranging step, the plurality of bonding materials is prepared as a laminated body which has at least two layers each of which has a different value in a CTE for each other, each layer of the laminated body is located at a different distance from said one of the pair of base members respectively.

3. The manufacturing method of an envelope for an image display apparatus according to claim 1, wherein in the arranging step, a plurality of glass frit are arranged as the plurality of bonding materials, each of the glass frit is prepared by baking at least once at a temperature of 350° C. or higher before the bonding respectively.

4. The manufacturing method of an envelope of an image display apparatus according to claim 1, wherein in the providing step, one of the pair of base members has a frame member and the other of the pair of base members does not have a frame member such that the difference in a heat capacity between the pair of base member.

5. A manufacturing method of an image display apparatus comprising:

forming an envelope using the manufacturing method of the envelope described in claim 1;

providing a plurality of image displaying members and a plurality of electron emitting devices facing each other on an inner surface of the envelope respectively; and exhausting a gas located in an internal space of the envelope so as to form a vacuum envelope.

6. A manufacturing method of an envelope for an image display apparatus comprising:

providing a pair of a base members, one of the pair of base member has a different value in a heat capacity and a CTE from the other of the pair of base member, a difference of a CTE between the pair of base member is within $10\times10^{-7}/°$ C.;

arranging a plurality of bonding materials between the pair of base members on top of one another such that one of the plurality of bonding materials faces one of the pair of base members which has a larger heat capacity than the other of the pair of base members and the other of the plurality of bonding materials faces the other of the pair of base members; and bonding the pair of the base members by irradiating an electromagnetic wave to the plurality of bonding material, wherein said one of bonding materials has a larger CTE than the other of bonding materials, a difference of CTE between the one of the bonding materials and the other of the bonding materials is within $10\times10^{-7}/°$ C., and where the CTE indicates a coefficient of thermal expansion.

* * * * *